Patented May 4, 1948

2,440,833

UNITED STATES PATENT OFFICE 2,440,833

SYNTHETIC JEWEL OR BEARING MATERIAL AND METHOD OF MAKING SAME

George S. Schaberle, Philadelphia, Pa., assignor to Bendix Aviation Corporation, Teterboro, N. J., a corporation of Delaware No Drawing. Application November 21, 1944, Serial No. 564,560

4 Claims. (Cl. 106—42)

This invention relates to synthetic jewel or bearing materials, especially jewel bearing materials as used in sensitive instruments and more particularly to a synthetic jewel material or glass as well as the process or method of making the same.

The present invention has for its objects the provision of a new and novel jewel bearing material possessing desirable qualities of surface hardness so as to be wear-resisting and to stand up effectively in use for long periods; which possesses greater impact strength, toughness, maximum desirable resiliency, high degree of surface tension, high specific gravity per mass, and greater work-absorbing power and qualities; as well as a bearing material which is clear and clean, and fractures cleanly without splintering, being a homogenous melt possessing no objectionable grit such as is inherent in glasses having a high silica content, and is uniformly smooth throughout its mass, being capable of economical production in quantities and in all forms for use in the manufacture of such jewel bearings and other articles of manufacture.

Hard glass and synthetic jewel materials, spinels, and crystalline stones have been produced for use as bearings, but most of these have been objectionable for one reason or another, because they did not lend themselves to thermoplastic molding, did not possess the necessary surface hardness, resiliency, wear-resisting qualities, impact strength, toughness, or were too soft and brittle, had a shattering fracture, were not uniformly smooth throughout their mass, or contained grit, seeds and stones or devitrified silica, or when broken or subjected to impact or pressure of any appreciable degree, would check or splinter thereby destroying their effectiveness as a desirable wear-resisting bearing or usefulness as a jewel.

The present invention is designed to overcome the above-related objections and to provide a jewel bearing material having the advantages set forth in a remarkable degree, and consists not only in the composition or mixture, that is, the bearing material per se, but also in the method or process of making or producing the same, and in such a manner as to give many advantages and more efficient results than was possible in bearing materials as heretofore composed and made, thus more efficiently serving its purpose and providing for a longer life of usefulness.

In accordance with the invention and to overcome the weaknesses of other well-known compositions and processes for making jewel bearing materials, I provide a glass material of the following composition by parts:

Ammonium aluminum alum_____ 400
Boracic acid_____ 120
Magnesium oxide_____ 40
Beryllium oxide or fluoride_____ 10
Zirconium oxide or zirconia_____ 10
Cobalt (metallic) or coloring agent_____ Trace I have found that the use of a form of spinel base, consisting of magnesium aluminate, and modified by boric anhydride, is best suited to produce a material composition, having better work-absorbing qualities as well as greater impact strength than ordinary sodium-silica or other commercial glasses. Instead of using spinel in the form of a crystalling stone, the latter not being thermoplastic at temperatures to allow it to be molded into small finished articles such as jewel bearings, the material of the present invention is prepared synthetically to combine with materials having some of the properties thereof, the other materials having desirable physical properties as above alluded to, so that the finished jewel bearings will possess the qualities and physical properties best suited for the uses stated without the objections referred to. Therefore, in preparing the material, a batch is made up of ingredients in the proportions by nominal weight as stated, the same being then intimately mixed in a suitable way, such as in an electrically powered mixer or a ball mill, then placed in a suitable vessel or crucible which is placed in a furnace and brought to a temperature of 2750 degrees Fahrenheit, in a time cycle of not less than one hour and ten minutes. This may be done in any suitable furnace electrically or otherwise suitably heated and vented to allow the escape of the volatile gases.

In the molding of jewels or jewel bearings from the synthetic jewel material or spinel glass, it becomes necessary to make quantities of the glass material in excess of the amounts necessary for immediate consumption by the drop method, that is from molten drops or globules from the original melted batch. This is due to the minute quantity consumed by a jewel or bearing and the apparent waste of fuel or power necessary to keep the material at its liquid temperature for long periods of time, or the alternative of allowing the furnace to cool and spoil the molten batch as well as the possibility of destroying the furnace lining or crucible. Furthermore, it may become desirable to mold jewels on several machines, some even at a considerable distance away from the material making furnace, possibly in some distant city or state. For this purpose, it is desirable to produce a material which will better permit the same to be drawn into cane form and then remelted to be made into bearings, jewels or other articles instead of being made directly into such form from the original molten batch by the drop method or otherwise. While the spinel glass formula hereinbefore described may be used to make jewels or bearings by the drop method and can be drawn into cane or rod form, it does not lend itself as well to drawing into cane or rod to be stored for future use, in that it has a tendency to crystallize or devitrify, as the temperature gradient passes through the lower liquidus temperature range. This occurs because the formula or composition above described is at a very critical apex of the atomic lattice-work, and the surface tension accelerator oxides of beryllium and zirconium have a tendency to separate out of solution.

In order to circumvent this de-vitrifying stage and to prepare a batch of the synthetic material or glass from which suitable cane may be drawn for future use and better serve its purposes efficiently, two other metallic oxides are used in place of the oxides of beryllium and zirconium. These substituted metallic oxides are preferably such as will act to give greater elasticity or flexibility and surface tension or resistivity and abrasive wear to the material. For this purpose, the metallic oxides of beryllium and zirconium are replaced with oxides of calcium and lead, the latter also known as monoxide or litharge, in substantially the same or slightly different proportions, as being suitable for the purposes stated, besides possessing other desirable characteristics. It has also been found that the beryllium and zirconium salts or oxides are prone to attack the walls of the refractories, corroding them to some extent and the result is that the silica and other components of the refractory material tend to enter into the glass batch. This is substantially if not entirely eliminated by the substituted metallic oxides and fibers drawn from the material made with the substituted metallic oxides are not only of equal flexibility but slightly better or greater than that obtained with beryllium oxide as determined by flexure test. Moreover, the abrasive hardness or work-absorbing ability and surface tension or resistivity to abrasive wear of the material is equal to or improved and since the specific gravity is increased by the use of litharge as compared to beryllium, a closer packing of the atomic structure per mass, is indicated. The method or process of preparing the material is the same as heretofore described using the same temperature gradient and the material may be drawn into cane or rod form and slowly cooled for future use without devitrification, thus allowing sufficient material to be made at one time or during one melt to last indefinitely for jewel molding purposes. The practical and economical side of this is obvious.

This substituted formula consists of the following composition by parts:

| | |
|---|---|
| Ammonium alum | 400 |
| Magnesium oxide | 40 |
| Boric acid | 120 |
| Calcium sulphate or oxide | 10 |
| Litharge (lead oxide or monoxide) | 20 |
| Cobalt (metallic) or coloring agent | Trace |

As in the previous composition or formula, any colorant or de-colorizer such as a trace of cobalt or other metallic coloring agent, may be added to the batch to give the desired coloring effect or appearance and without upsetting the boro-magnesium-aluminate base and it lends itself well to large batch manufacture.

The results from tests prove conclusively that in addition to freedom from silica and grit which are present in glass as heretofore produced, the reduction of boric anhydride to below 13 percent of the dehydrated batch, and with additions of not over three percent respectively of beryllium and zirconium oxides, the most desirable results are obtained. Boules of such a batch have a specific gravity of approximately 2.70 to 2.80, and a Knoop hardness of 707 to 784. At a temperature of about 2732 degrees F., the batch as thus intimately mixed and heated, melts and goes into a viscous state, and at 2750 degrees F., which it is important to attain in one hour and ten minutes, for the measured weight or parts of the materials shown in the foregoing formula, according to experiment and actual practice, the mixture goes into a liquid state. It is then preferably allowed to cool slightly into a viscous state to mold or work into jewel bearings or other articles of commerce, or draw into rod or cane form for later molding or forming.

The material of the above compositions may be readily molded or prepared into suitable form economically and with facility, and in suitable quantities for making jewel bearings or other articles of manufacture. In such form it breaks clean with a very smooth cleavage without checking or splintering.

What I claim and desire to obtain by Letters Patent is:

1. Jewel material made from a mixture of the oxides of ammonium aluminum alum of about 400 parts, boric acid 120 parts, magnesium oxide 40 parts, calcium sulphate 10 parts, and litharge 20 parts.

2. Jewel material made from a mixture of ammonium aluminum alum 400 parts, boric acid 120 parts, magnesium oxide 40 parts, calcium sulphate 10 parts, litharge 20 parts and a trace of a metallic coloring agent.

3. The process of producing a jewel material consisting of intimately mixing 400 parts ammonium aluminum alum, 120 parts boric acid, 40 parts magnesium oxide, 10 parts calcium sulphate, 20 parts litharge, and heating the mixture to a temperature of approximately 2750° F. in approximately one hour and ten minutes.

4. The process of producing a jewel material consisting of intimately mixing 400 parts ammonium aluminum alum, 120 parts boric acid, 40 parts magnesium oxide, 10 parts calcium oxide, 20 parts litharge, and heating the mixture to a temperature of approximately 2750° F. in approximately one hour and ten minutes.

GEORGE S. SCHABERLE.

REFERENCES CITED

The following references are of record in the file of this patent:

UNITED STATES PATENTS

| Number | Name | Date |
|---|---|---|
| 2,090,098 | Berger | Aug. 17, 1937 |

FOREIGN PATENTS

| Number | Country | Date |
|---|---|---|
| 442,937 | France | 1912 |

OTHER REFERENCES

Ser. No. 235,108, Ditericks (A. P. C.), pub. June 15, 1943.